(12) United States Patent
Kubo et al.

(10) Patent No.: US 6,927,794 B2
(45) Date of Patent: Aug. 9, 2005

(54) DIGITAL CAMERA PROVIDED WITH A PLURALITY OF MOUNTING PORTIONS TO EACH OF WHICH A RECORDING MEDIUM IS MOUNTED

(75) Inventors: Hiroaki Kubo, Muko (JP); Yasuhiro Morimoto, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 802 days.

(21) Appl. No.: 09/730,451

(22) Filed: Dec. 5, 2000

(65) Prior Publication Data

US 2001/0006400 A1 Jul. 5, 2001

(30) Foreign Application Priority Data

Dec. 9, 1999 (JP) ............................................ 11-350379

(51) Int. Cl.[7] ................................................ H04N 5/76
(52) U.S. Cl. .................................. 348/231.8; 348/231.9
(58) Field of Search ............... 348/231.99, 231.7–231.9, 348/231.2; 396/321

(56) References Cited

U.S. PATENT DOCUMENTS

| | | | | |
|---|---|---|---|---|
| 5,067,029 A | * | 11/1991 | Takahashi | .................... 386/38 |
| 5,640,203 A | | 6/1997 | Wakui | ........................ 348/231 |
| 5,986,700 A | * | 11/1999 | Wakui | ...................... 348/231.8 |
| 6,661,454 B1 | * | 12/2003 | Hwang et al. | ............ 348/231.1 |
| 6,727,924 B1 | * | 4/2004 | Adachi | ........................ 345/851 |

FOREIGN PATENT DOCUMENTS

| | | |
|---|---|---|
| JP | 64-047177 A | 2/1989 |
| JP | 3-91022 A | 4/1991 |
| JP | 04-078280 A | 3/1992 |
| JP | 05-091455 A | 4/1993 |
| JP | 7-85570 A | 3/1995 |
| JP | 11-146328 A | 5/1999 |

OTHER PUBLICATIONS

*Photo International*, vol. 31, No. 366, Aug., 1999, cover page and pp. 10–11.

* cited by examiner

*Primary Examiner*—Wendy R. Garber
*Assistant Examiner*—Timothy J. Henn
(74) *Attorney, Agent, or Firm*—Sidley Austin Brown & Wood LLP (57) ABSTRACT

The CPU 17 accesses multiple slots 41a and 41b in a digital camera 1 at regular intervals to detect whether or not memory cards 40a and 40b are mounted in the slots 41a and 41b, respectively. Based on whether or not memory cards 40a and 40b are mounted in the slots 41a and 41b, respectively, the CPU 17 selects one slot as the slot to be accessed. There are three modes available as the mode from which to perform this selection, i.e., a fixed mode, a priority mode and a manual operation mode.

9 Claims, 11 Drawing Sheets

DIGITAL CAMERA PROVIDED WITH A PLURALITY OF MOUNTING PORTIONS TO EACH OF WHICH A RECORDING MEDIUM IS MOUNTED

This application is based on application No. Hei 11-350379 filed in Japan, the content of which is hereby incorporated by reference.

BACKGROUND OF THE INVENTION

1. Field of the Invention

The present invention pertains to a digital camera equipped with multiple mounting portions in which recording media may be housed.

2. Description of the Prior Art

A digital camera generally is constructed such that a detachable memory card may be mounted in it in order to store picked-up images. In recently years, in order to increase the number images to be picked-up and stored, digital cameras having two slots have become available, enabling the mounting of two memory cards.

When taking a picture, the user designates whether to store the image in the memory card mounted in the first slot or in the memory card mounted in the second slot through the operation of an alternating switch, and by performing the image storing processing to the designated memory card, the pick-up image is stored in the memory card that the user desires.

However, in a two-slot digital camera of this type, a storing processing is performed only to the slot designated by the user. Therefore, if a slot in which no memory card is mounted is designated, an image storing error results. For example, where a memory card is mounted in the first slot only and the user designates the second slot, i.e., the slot having no memory card, as the slot to which the image should be stored, because no memory card exists in the designated second slot, an image storing error results.

There are also times when the user mounts a memory card without paying close attention to the slot in which the memory card is being mounted. In such a case, it is difficult to properly designate the slot for image storing. In particular, when the user wants to take a picture quickly, if the wrong slot is designated, a storing error result and no image storing takes place, which may result in a missed photo-taking opportunity.

In addition, it is preferred that a certain rule be established beforehand as to which of the memory cards in the two slots should be used for image storing. If the memory card to be used is randomly determined, the problem may occur that the image is stored in the memory card that the user did not intend to use. It is also desirable that the user can clearly know which one of the memory cards in the two slots is being used for image storing.

SUMMARY OF THE INVENTION

The present invention was made in view of the problems identified above, and the object of the present invention is to provide a digital camera using which no errors occur even if the user mounts a recording media without paying attention to the mounting portion in which it is being mounted.

In order to attain these and other objects, one aspect of the present invention comprises a digital camera having multiple mounting portions in which recording media may be housed, said digital camera also having a detector that detects whether or not the recording media are mounted in the multiple mounting portions and a selector that selects from among the multiple mounting portions the portion to be accessed based on the detected mounting status, wherein, where at least two recording media are mounted in the multiple mounting portions, the selector selects the mounting portion in which a recording medium was mounted first as the mounting portion to be accessed.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

FIGS. 1(*a*) and 1(*b*) are drawings showing an external view of a digital camera as one embodiment of the present invention.

FIGS. 2(*a*) and 2(*b*) are drawings showing an external view of the digital camera.

DETAILED DESCRIPTION OF THE PREFERRED EMBODIMENTS

The embodiments of the present invention are explained below with reference to the drawings.

<1. Construction of Digital Camera>

Figure 1:
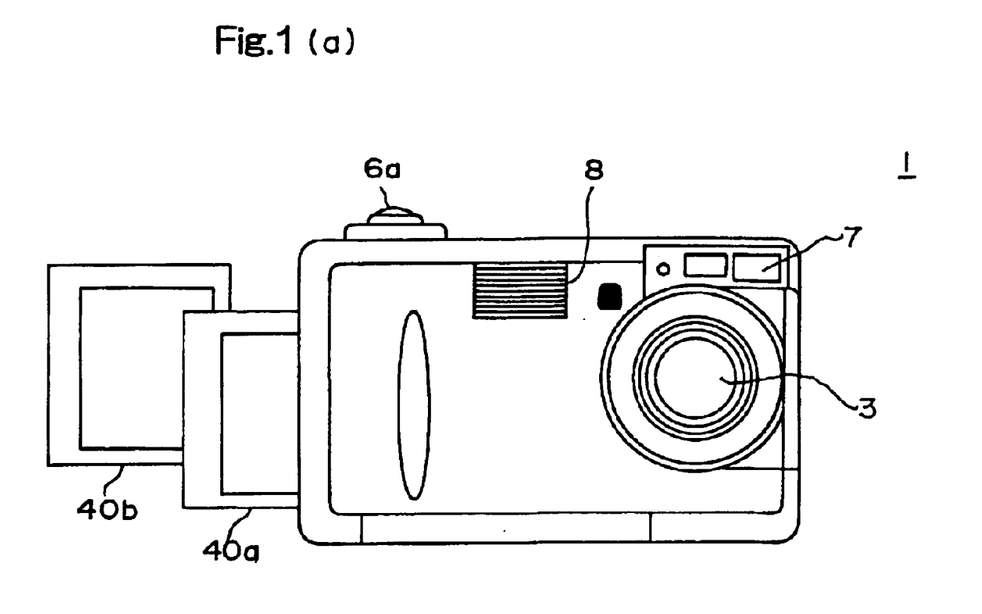
Figure 2:
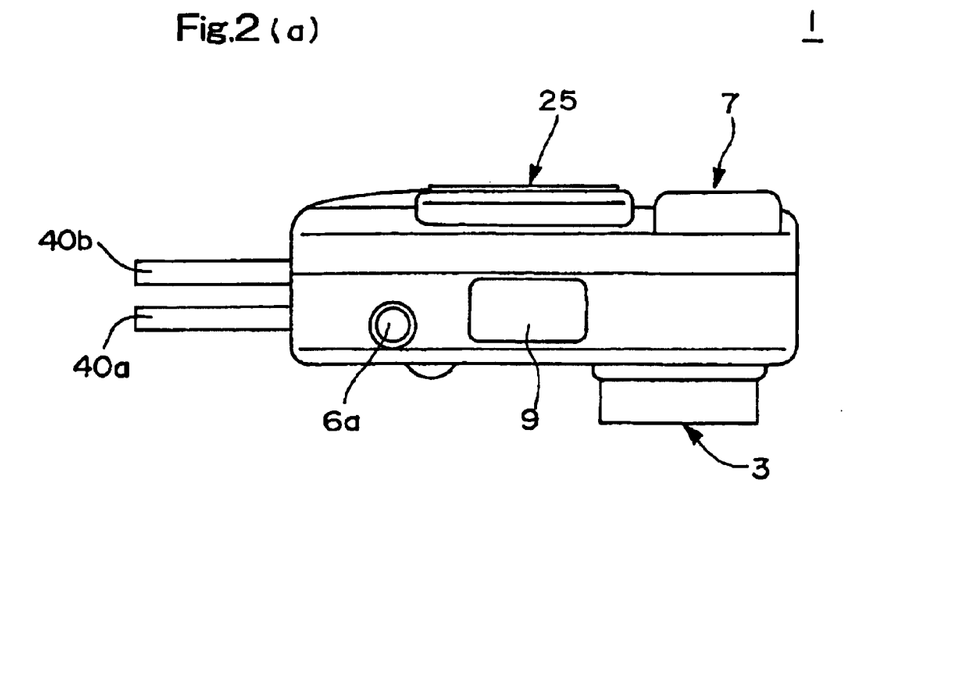

FIG. 1(*a*) is a front elevation, FIG. 1(*b*) is rear elevation, FIG. 2(*a*) is a plan view and FIG. 2(*b*) is a side elevation of a digital camera 1.

A lens unit 3 to make images of an object, an objective lens of a viewfinder 7 to determine the range to be photographed, and an electronic flash 8 to illuminate the object are located on the front side of the digital camera 1. A viewfinder 7 eyepiece, a monitor 25 comprising a color liquid crystal display to confirm the picked-up image, an setting alternating switch 6*b* to set the selection mode from which to select the slot to be accessed, and four-direction keys 6*c*, 6*d*, 6*e* and 6*f* to scroll the picked-up image and to change the various setting parameters are located on the rear side of the digital camera 1.

A shutter start button 6*a* to begin the pick-up of the object image to be recorded and a camera function display 9 that displays the card names specified for the memory cards 40*a* and 40*b* mounted in the slots 41*a* and 41*b* as well as the photographing parameters, and that displays the slot to be accessed in order for the user to visually confirm which card is to be accessed, i.e., the memory card 40a or 40b, should be used to store the object image. The camera function display unit 9 comprises a small size monochrome liquid crystal display. By locating it separately from the monitor 25 that is used to confirm the picked-up image, the user can visually check the photographing parameters during the image pick-up.

Figure 4:
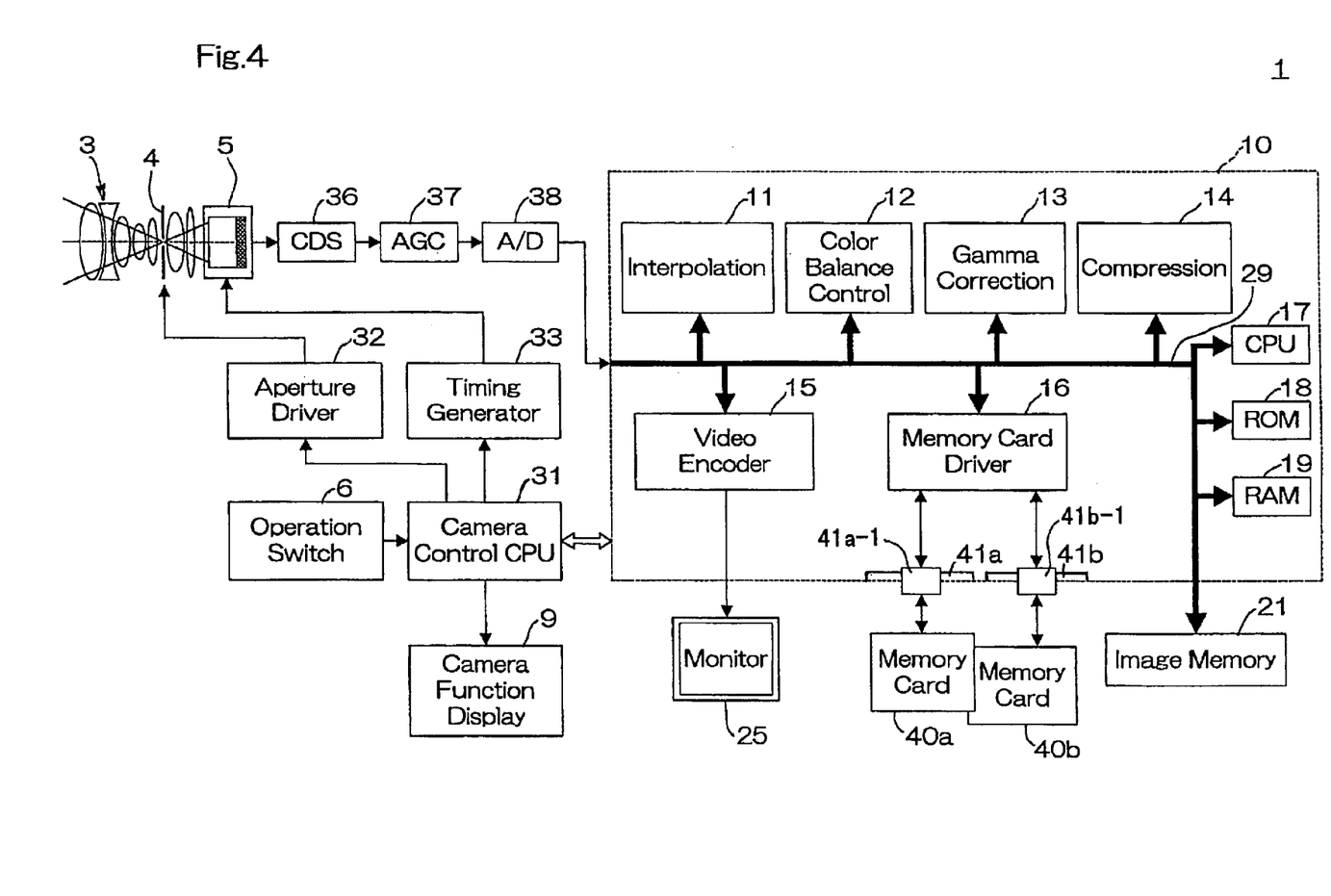
FIG. 4 is a block diagram showing the functional construction of the digital camera.

Furthermore, as shown in FIG. 2(b), two slots 41a and 41b are located on one side of the digital camera 1 so that two memory cards 40a and 40b may be mounted. One memory card 40a or 40b may be mounted in the slot 41a or 41b, respectively. Connector 41a-1 which is mechanically and electrically connected to the memory card mounted in the slot 41a is located inside the slot 41a. Connector 41b-1 which is mechanically and electrically connected to the memory card mounted in the slot 41b is located inside the slot 41a. Each of the connectors includes respectively a plurality of connecting pins, for example. The connectors 41a-1 and 41b-1 are schematically illustrated in FIG. 4. Regarding this embodiment, an example that has two memory card mounting slots will be used for convenience of explanation, but the present invention is not limited to this construction. The number of slots may be three or more. In addition, in order for the user to distinguish these slots from each other, such markings as 'Slot A' and 'Slot B' are indicated near the memory card mounting inlets of the slots 41a and 41b, respectively.

It is also acceptable if the camera has only one slot with connectors inside so those two or more memory cards may be mounted.

Figure 3:
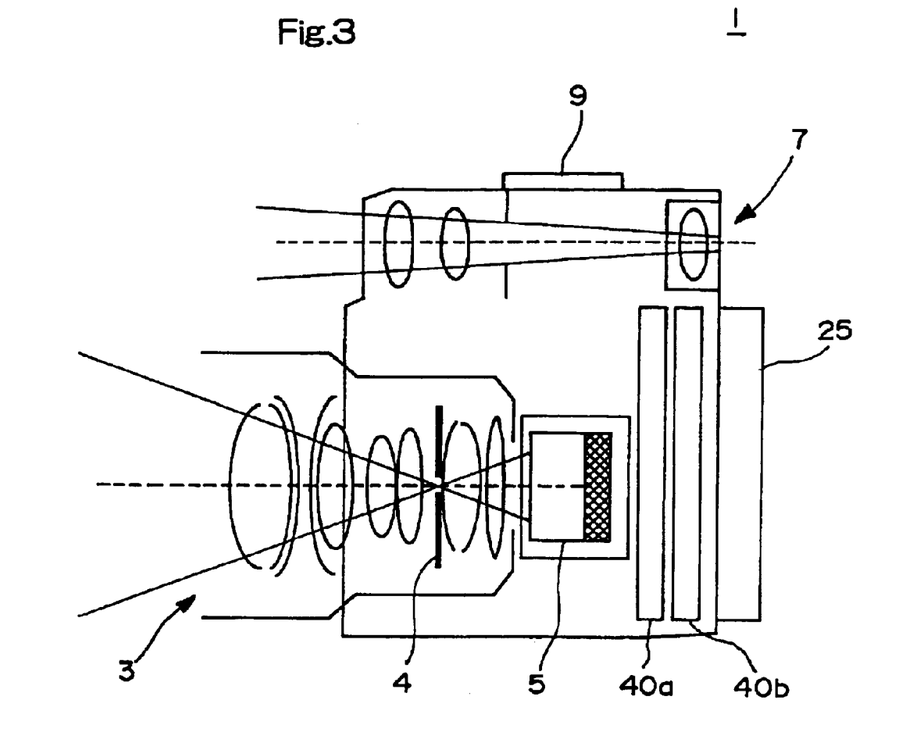
FIG. 3 shows the basic internal construction of the digital camera.

FIG. 3 shows the basic internal construction of the digital camera 1 constructed as described above. As shown in FIG. 3, the digital camera 1 has an aperture stop 4 in the lens unit 3, and an image pick-up sensor 5 inside, and may house two memory cards 40a and 40b.

The image pick-up sensor 5 has multiple pixels aligned on a plane (imaging plane or focal plane) that is perpendicular to the optical axis, and comprises a CCD area sensor in which reading is performed for all pixels. Red, green and blue primary color filters are applied on the imaging surface of the image pick-up sensor 5 in a checkered fashion on a pixel-by-pixel basis, so that each pixel is sensitive to each color component of the light incident on the sensor via the lens unit 3 and aperture stop 4. In the image pick-up sensor 5 having this construction, the amount of exposure is regulated through control of the charge accumulation time.

The functional construction of the digital camera 1 will now be explained. FIG. 4 is a block diagram showing the functional construction of the digital camera 1.

An image signal that has undergone photoelectric conversion inside the image pick-up sensor 5 is shifted to the transfer path, which is shielded from light, and reading is sequentially performed for each pixel from this transfer path via a buffer. The image signal obtained by means of the image pick-up sensor 5 is led to an image processor 10 via a Correlated Double Sampling circuit (CDS) 36, an Automatic Gain Controller (AGC) 37, and an Analog to Digital (A/D) converter 38. In other words, an image signal undergoes sampling in the CDS 36, where the image pick-up sensor 5 noise is eliminated, and is then corrected for sensitivity in the AGC 37. The A/D converter 38 comprises a ten-bit A/D converter, for example, and converts into a digital signal the normalized analog signal that is obtained from the AGC 37. Therefore, the image signal led to the image processing unit 10 comprises a digital signal.

In addition, in order to control each component of the digital camera 1, a camera control CPU (Central Processing Unit) 31 is located inside the camera. This camera control CPU 31 functions as a controller during image pick-up, and sends control signals to the aperture driver 32 and the timing generator 33.

The aperture value for the aperture stop 4 and the charge accumulation time for the image pick-up sensor 5 are calculated by the camera control CPU 31. Based on the calculation results, the camera control CPU 31 provides control signals to the aperture driver 32 and the timing generator 33, creating a control system that ensures that the image pick-up sensor 5 receives the proper amount of exposure during image pick-up.

Based on the control signals from the camera control CPU 31, the aperture driver 32 drives the aperture stop 4 to adjust the aperture diameter, and the timing generator 33 controls the charge accumulation time for the image pick-up sensor 5, which is determined by the timing to begin charge accumulation and the timing to end it.

The operation switches 6 are used by the user to either input the photographing parameters and image processing parameters or perform an photographing operation, and include the shutter start button 6a, the setting alternating switch 6b and the four-direction keys 6c, 6d, 6e and 6f. The camera control CPU 31 sets various photographing parameters based on the input from the operation switches 6 to make them effective, or displays the settings in the camera function display 9 located on the top side of the digital camera 1. When the shutter start button 6a, which is included among the operation switches 6, is pressed down completely, the camera control CPU 31 performs image pick-up by controlling the aperture stop 4 and image pick-up sensor 5 as described above.

The camera control CPU 31 is constructed such that it can mutually exchange data with the image processor 10. It sends display data to the image processor 10 so that the various setting parameters may be displayed on the monitor 25. It also receives the data indicating which of the memory cards 40a and 40b is to be accessed, displays the slot to be accessed in the camera function display 9, which functions as the selection slot display, and displays the card names of the memory cards 40a and 40b mounted in the slots 41a and 41b, respectively.

On the other hand, the image processor 10 that performs multiple types of processing to the digitized image signal comprises, for example, a one-chip Integrated Circuit, and includes a pixel interpolation circuit 11, a color balance controller 12, a gamma correction circuit 13, an image compressor 14, a video encoder 15, a memory card driver 16, a CPU (Central Processing Unit) 17, a ROM (Read Only Memory) 18 and a RAM (Random Access Memory) 19, which are mutually connected via a data bus 29. The image processing unit 10 may also access the image memory 21 that functions as a temporary memory in which data of the picked-up image obtained from the image pick-up sensor 5 is temporarily stored.

When a digitized image signal is input to the image processor 10, it is stored in the image memory 21. The image stored in the image memory 21 undergoes pixel interpolation by the pixel interpolation circuit 11, white balance adjustment by the color balance controller 12 and prescribed conversion by the gamma correction circuit 13, and is stored in the image memory 21 once more.

In the pixel interpolation circuit 11, after the image data is read from the image memory 21 in which it is stored and masking is performed using the filter pattern of the primary color filters, averaging interpolation is performed for the pixels surrounding prescribed pixels for each color component.

In the color balance controller 12, white balance adjustment is performed based on gain correction performed independently for red, green and blue regarding the image signal of each color component that is generated through the pixel interpolation. Specifically, the area that is thought to be originally white is estimated from the brightness and saturation of the object, and the gain for each color component is set based on the red, green and blue of that area. By performing correction for each color component using the gains thus obtained, white balance adjustment is automatically performed, that is, so-called 'auto white balance' process is carried out.

Furthermore, in the gamma correction circuit 13, non-linear conversion compatible with the output device (such as the monitor 25 or an external CRT, for example) is performed to the image data that has undergone white balance adjustment.

The image compressor 14 performs compression of the image stored in the image memory 21 using the JPEG method in order to reduce the amount of image data to be stored on the memory card 40a or 40b.

The memory card driver 16 is electrically connected to the two connectors 41a-1 and 41b-1 inside the slots 41a and 41b in which memory cards are mounted. It accesses the memory card 40a or 40b mounted in the slot 41a or 41b to store or read image and other data. The memory cards 40a and 40b comprise portable storing media and may be mounted in and removed from the slots 41a and 41b, respectively.

The video encoder 17 encodes the image data into NTSC or PAL data in order to display the image stored in the image memory 21 or memory card 40a or 40b on the monitor 25, and causes the image to be displayed on the monitor 25. As a result, the monitor 25 functions as a picked-up image display.

The CPU 17 is constructed such that it may access the ROM 18 and RAM 19, and reads the programs stored in the ROM 18 and performs various functions by executing the programs. It controls the operations of the various components described above and selects the slot to be accessed, by monitoring whether the memory cards 40a or 40b are mounted in the two slots 41a and 41b, respectively.

<2. Functions Performed by the CPU 17>

Figure 5:
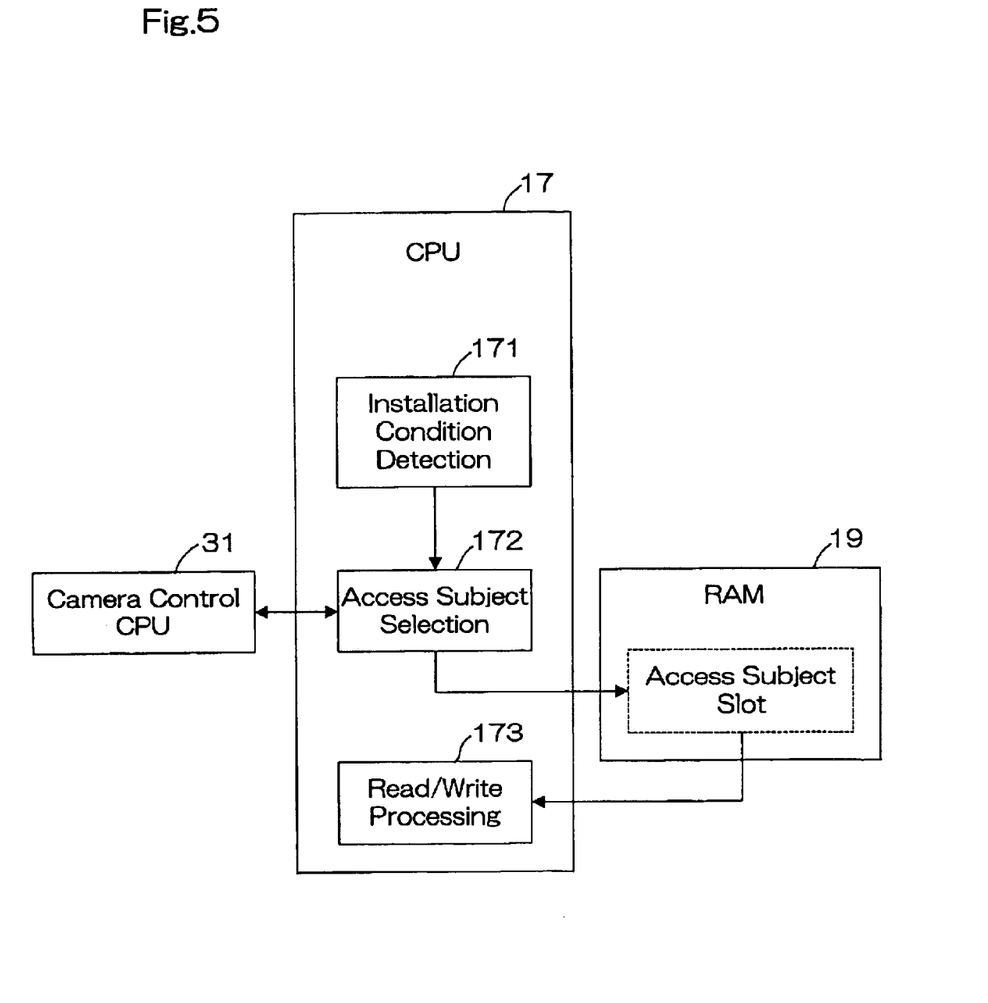
FIG. 5 is a block diagram schematically showing the functions performed by the CPU.

FIG. 5 is a block diagram showing in a schematic fashion the functions performed by the CPU 17. The functions for controlling the operations of the various components described above, such as the pixel interpolation circuit 11, are omitted from the drawing. As shown in FIG. 5, the CPU 17 performs the functions of a mounting status detector 171, an access slot selector 172 and an image store/read processor 173. In the explanation that follows below, the functions 171 through 173 are described as if they are independent components, but they are all functions of the CPU 17. However, they may be performed by means of independent components (i.e., circuits).

The mounting status detector 171 detects whether or not memory cards are mounted, by accessing the slots 41a and 41b via the memory card driver 16 at certain intervals and determining whether or not memory cards 40a and 40b are mounted. Therefore, where a memory card was not mounted in a given slot when it was accessed previously but a memory card is determined to be mounted when the same slot is subsequently accessed, the mounting status detector 171 can recognize that a memory card is newly mounted in that slot. The memory card mounting status of the slots 41a and 41b is communicated to the access slot selector 172.

The access slot selector 172 selects one of the two slots 41a and 41b as the slot to be accessed. There are three operation modes available for this selection. Which one of these three modes will be used for the selection of the slot to be accessed is specified by the user performing an alternating operation of the setting alternating switch 6b for mode setting. The camera control CPU 31 then communicates the setting of the setting alternating switch 6b to the access slot selector 172. Therefore, the access slot selector 172 selects and determines the slot to be accessed from among the two slots 41a and 41b in accordance with the mode thus specified.

However, where the mounting status detector 171 recognizes that only one of the slots 41a and 41b has a memory card, since it is not possible to perform storing or reading of images even if the slot in which no memory cards are mounted is chosen as the slot to be accessed, the slot in which a memory card is mounted is automatically selected as the slot to be accessed. Therefore, it is only when both memory cards 40a and 40b are recognized by the mounting status detector 171 to be mounted in both slots 41a and 41b that the slot to be accessed is selected based on one operation mode from among the three operation modes as described above.

When the slot to be accessed is selected, the access slot selector 172 stores the information in the RAM 19. The access slot selector 172 also transmits the information on the slot to be accessed to the camera control CPU 31. By transmitting this information to the camera control CPU 31, it becomes possible to display which slot was selected as the slot to be accessed in the camera function display 9.

The CPU 17 then functions as an image store/read processor 173 to store the picked-up image onto the memory card or to read the picked-up image stored on the memory card. It performs an image storing operation or image reading operation as to the slot to be accessed from among the two slots 41a and 41b, the information on which is stored in the RAM 19.

The operation modes in which to select the slot to be accessed will now be explained.

The first mode is a fixed mode in which a pre-determined slot is selected as the slot to be accessed from among the two slots 41a and 41b. This fixed mode is associated with the upper level of the setting alternating switch 6b, such that this mode becomes activated when the user moves the setting alternating switch 6b to the upper level. In this mode, the specified slot, information regarding which is stored in the RAM 19, is read, and the slot that corresponds to the specified slot is determined to be the slot to be accessed. Either the slot 41a or 41b may be specified as the specified slot. For example, where the slot 41b is set as the specified slot and memory cards 40a and 40b are mounted in both slots 41a and 41b, the slot 41b is selected as the slot to be accessed at all times in this fixed mode. The information indicating the specified slot is stored in the ROM 18 in advance, and is stored in the RAM 19 when the system is powered up.

The second mode is a priority mode in which the slot in which a memory card was first mounted is selected as the slot to be accessed from between the two slots 41a and 41b. This priority mode is associated with the middle level of the setting alternating switch 6b, such that this mode becomes activated when the user moves the setting alternating switch 6b to the middle level. Where the priority mode is activated, when the mounting status detector 171 detects that a memory card has been newly mounted in one of the slots, if a memory card already resides in the other slot, the access slot selector 172 selects the other slot, i.e., the slot in which a memory card was first mounted, as the slot to be accessed.

Where there are two slots, if the construction of the camera is such that the slot to be accessed will not change when only one memory card is mounted and a memory card has been newly mounted, the slot in which a memory card was first mounted may be selected as the slot to be accessed. If a memory card is then removed, the slot that has a memory card should be selected as the slot to be accessed in the same way when only one memory card is mounted.

Where there are three or more slots, if the construction of the camera is such that the slot to be accessed is not changed when only one memory card is mounted and one or more memory cards have been newly mounted, the slot in which a memory card was first mounted may be selected as the slot to be accessed. However, when one memory card is removed from the situation in which three or more memory cards are mounted, it is necessary to determine which slot received a memory card first among the slots in which memory cards still remain. Therefore, where there are three or more slots, the mounting order of the cards in the slots in which a memory card was mounted must be separately saved in the RAM 19. By saving this information, even where one memory card is removed, the slot in which a memory card was first mounted may be distinguished from the other slots.

By selecting the slot to be accessed using the priority mode in this way, image storing may be performed into the memory card that was first mounted in the digital camera, and then into a different memory card that was mounted afterward, such as when the first memory card runs out of capacity. Therefore, it becomes possible to sequentially store picked-up images in accordance with the order of memory card mounting.

The third mode is a manual operation mode in which one slot is selected as the slot to be accessed from between the two slots 41*a* and 41*b* by the user operating the operation switches 6 as desired. This manual operation mode is associated with the lower level of the setting alternating switch 6*b*, and becomes activated when the user moves the setting alternating switch 6*b* to the lower level. When the manual operation mode is set, a guide screen for the user to specify a slot is displayed in the monitor 25 located in the rear side of the digital camera 1.

Figure 6:
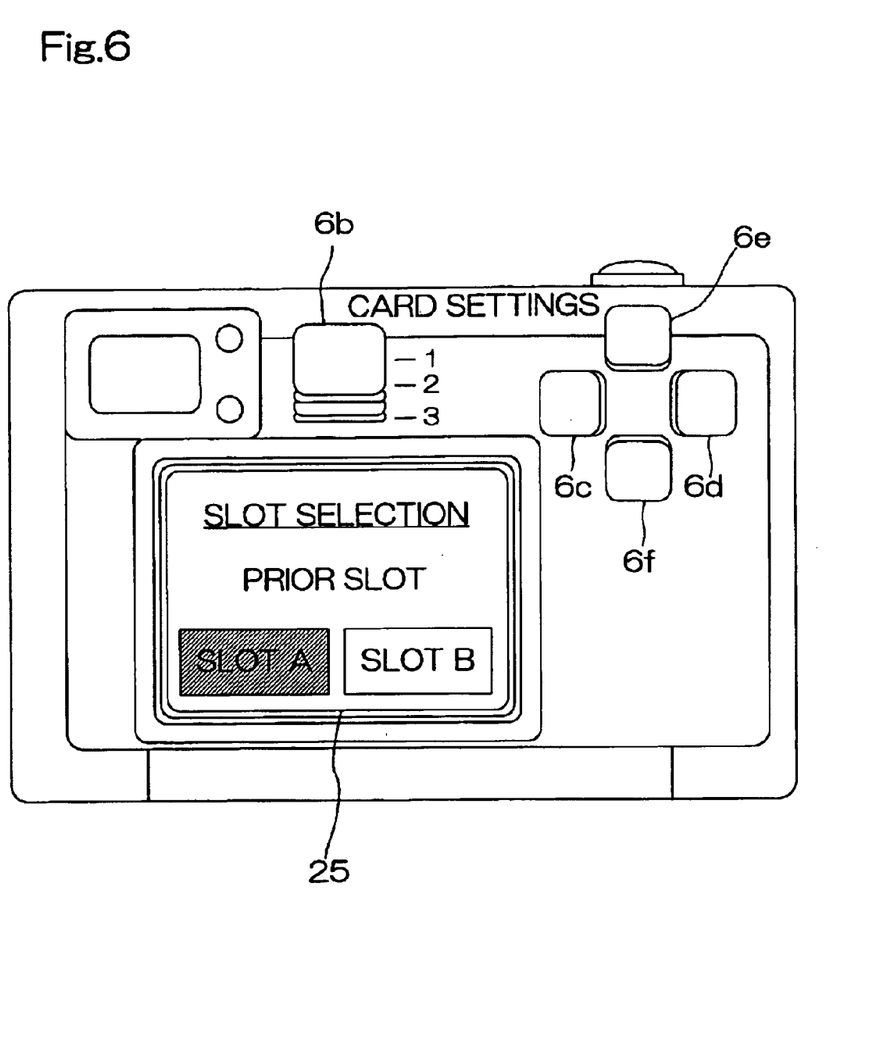
FIG. 6 is a drawing showing the guidance display in the manual operation mode.

FIG. 6 shows the guide screen in the manual operation mode. Where the setting alternating switch 6*c* is set to the lower level, the CPU 17 displays the guide screen shown in FIG. 6 in the monitor 25 so that the user may easily designate the slot to be accessed. In the display state shown in FIG. 6, Slot A is selected from between Slot A, which corresponds to the slot 41*a*, and Slot B, which corresponds to the slot 41*b*. The selection may be changed by the user operating the leftward key 6*c* or the rightward key 6*d* from among the four-direction keys 6*c* through 6*f*. For example, where the user operates the rightward key 6*d* when Slot A is selected as shown in FIG. 6, a change may be made so that Slot B is selected. When the user operates the downward key 6*f* from among the four-direction keys 6*c* through 6*f*, the slot displayed as selected may be settled as the slot to be accessed.

Therefore, in this manual operation mode, the slot to be accessed may be manually selected based on the user's desires when a memory card 40*b* is mounted in the slot 41*b* after a memory card 40*a* was mounted in the slot 41*a*, and the user desires to store the picked-up images in the memory card 40*b* that was subsequently mounted, for example.

In this embodiment, there are three operation modes for selecting the slot to be accessed, as described above, such that a memory card may be selected based on the user's desires as the memory card to be accessed by the user operating the setting alternating switch 6*b*.

<3. Operation Sequence>

The operation sequence that is followed when the slot to be accessed is selected by the CPU 17 from between the slots 41*a* and 41*b* will now be explained with reference to the flow charts. FIGS. 7 through 10 are flow charts showing the operation sequence followed when the slot to be accessed is selected.

Figure 7:
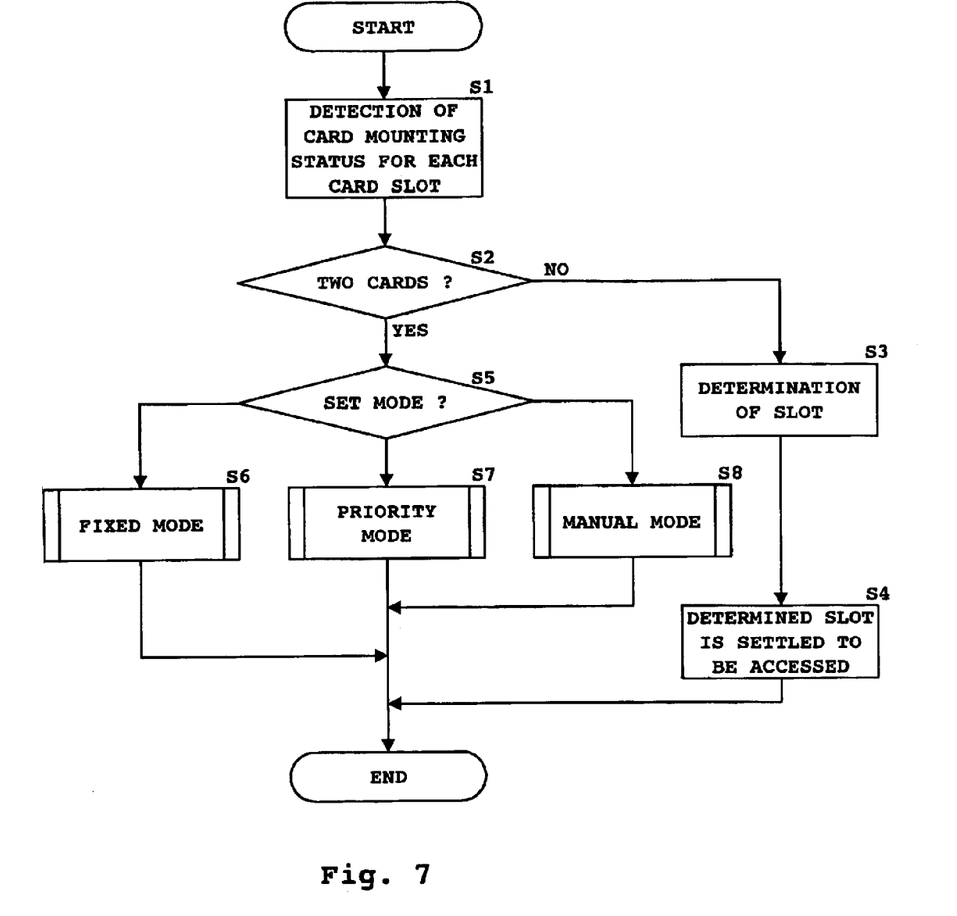
FIG. 7 is a flow chart showing the operation sequence when the slot to be accessed is selected.

The CPU 17 functions as a mounting status detector 171 and detects whether memory cards are mounted in the slots 41*a* and 41*b* (step S1). It then determines whether or not the number of memory cards mounted in the digital camera 1 is two. If it is two, YES is determined and the CPU 17 advances to step S5. If it is one, NO is determined and the CPU 17 advances to step S3.

In step S3, the CPU 17 determines whether the one memory card detected is mounted in the slot 41*a* or slot 41*b*. The CPU 17 then advances to step S4, in which it functions as an access slot selector 172, and specifies as the slot to be accessed the slot determined to be housing the memory card.

On the other hand, in step S5, where the mode set by means of the setting alternating switch 6*b* is identified, and if that mode is the fixed mode, the CPU 17 advances to step S6, whereas if the set mode is the priority mode, the CPU 17 advances to step S7. If the set mode is the manual mode, the CPU 17 advances to step S8.

Figure 8:
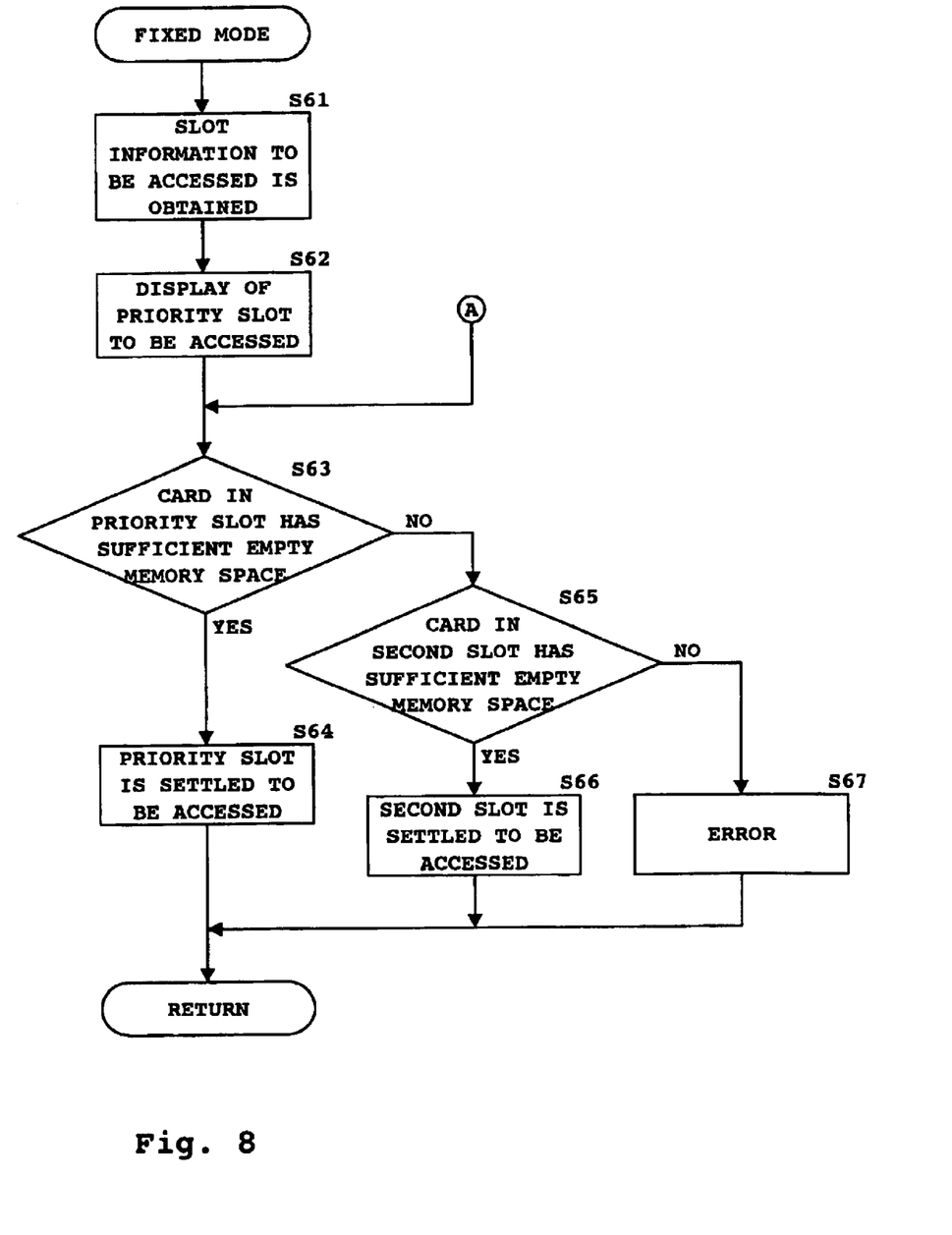
FIG. 8 is a flow chart showing the operation sequence when the slot to be accessed is selected.

The flow chart shown in FIG. 8 is followed as the operation sequence when the fixed mode is activated. In step S61, the CPU 17 obtains the information on the slot to be accessed from the RAM 19 and specifies that slot as the slot to be accessed. The CPU 17 then advances to step S62, in which it transmits the information on the slot specified as the slot to be accessed (priority slot) to the camera control CPU 31 and instructs the camera function display 9 to display the priority slot.

Figure 11:
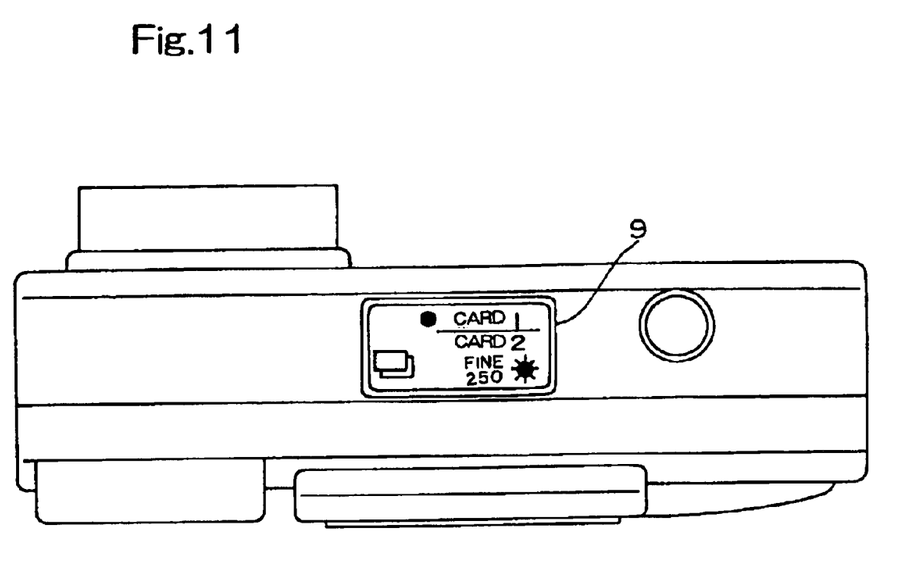
FIG. 11 is a drawing showing the priority slot image displayed in the camera function display.

FIG. 11 shows the screen shown in the camera function display 9 through this priority slot display. As shown in FIG. 11, the camera function display 9 displays the card names stored in the two memory cards 40*a* and 40*b* mounted in the two slots 41*a* and 41*b*, the priority slot and the photographing parameters. The card names and the priority slot are displayed in the upper area of the camera function display 9, while the photographing parameters are displayed using the segment display method in the lower area of the camera function display 9.

The card name stored in the memory card 40*a* mounted in the slot 41*a*, i.e., 'CARD 1', is displayed in the upper part, and the card name stored in the memory card 40*b* mounted in the slot 41*b*, i.e., 'CARD 2', is displayed in the lower part, as shown in FIG. 11. By displaying the card names in this way, even if the user mounted the memory cards 40*a* and 40*b* without distinguishing which card went into the slot 41*a* or 41*b*, it is easy for the user to visually determine which card is mounted in which slot.

The priority slot is indicated through the display of a prescribed mark (a circle in FIG. 11) to indicate the slot to be accessed that was specified in step S61. By displaying the priority slot in this way, the user may easily confirm which memory card may be first accessed, and if image storing is performed to 'CARD 2' during actual photographing even when the displayed priority slot is 'CARD 1', the user can deduce that the memory card 40*a* mounted in the slot 41*a* has no more free memory space.

When the display of the priority slot in the camera function display 9 is completed, the CPU 17 then advances to step S63, where it checks the remaining memory in the memory card mounted in the priority slot, and where there is sufficient memory to store the picked-up image, the CPU 17 advances to step S64 and establishes the priority slot as the slot to be accessed.

On the other hand, where there is not sufficient memory in the memory card mounted in the priority slot, the CPU 17 advances to step S65, where it checks the available memory in the memory card mounted in the second slot, which is different from the priority slot. Where there is sufficient memory available in the memory card mounted in the second slot, the CPU 17 sets the second slot as the slot to be accessed in step S66. Where the card mounted in the second slot also lacks sufficient memory, the CPU 17 advances to step S67, and since the picked-up image may not be stored anywhere, an error routine is carried out.

Figure 9:
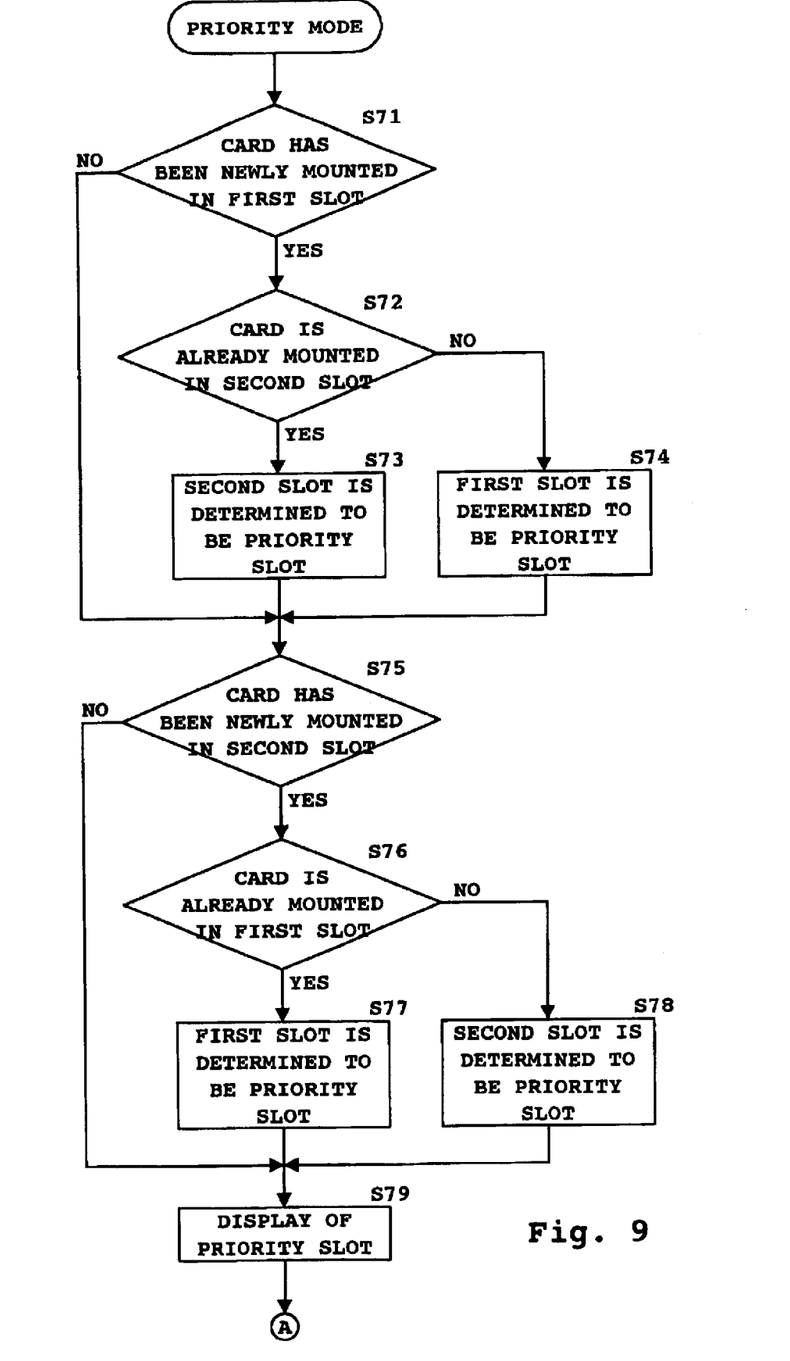
FIG. 9 is a flow chart showing the operation sequence when the slot to be accessed is selected.

The operation sequence when the priority mode is activated is shown in the flow chart shown in FIG. 9. In step S71, the CPU 17 determines whether or not a memory card has been newly mounted in the first slot, which comprises either the slot 41a or 41b. Where a memory card has been newly mounted in the first slot, the CPU 17 advances to step S72, where it determines whether or not a memory card is already mounted in the second slot, which is the other slot. Where a memory card is already mounted in the second slot, that means that the memory card in the second slot was mounted first. Consequently, the second slot is deemed the priority slot (step S73). On the other hand, where no memory card is mounted in the second slot, the first slot is deemed the priority slot, in the same way as when only one memory card is mounted in the camera (step S74).

The CPU 17 then advances to step S75 and determines whether or not a memory card has been newly mounted in the second slot. Where a priority slot is already set in the step S73 or S74, NO is determined in this step S75 and the sequence advances to step S79. On the other hand, where NO is determined in step S71, the CPU 17 advances to step S75 so as to determine the memory card in the second slot. When YES is determined in step S75, the CPU 17 then determines whether or not a memory card is already mounted in the first slot (step S76), and where a memory card is already mounted in the first slot, that means that the memory card in the first slot was mounted first, and therefore the first slot is deemed the priority slot (step S77). On the other hand, where no memory card is mounted in the first slot, the second slot is deemed the priority slot, in the same way as when only one memory card is mounted in the camera (step S78).

Based on this routine, either of the slots 41a and 41b is deemed the priority slot. The CPU 17 then advances to step S79, and communicates which slot is the priority slot to the camera control CPU 31, whereupon the priority slot is displayed in the camera function display 9 as shown in FIG. 11.

The CPU 17 then advances to the sequence from step S63 onward shown in the flow chart of FIG. 8 to check the available memory space of the memory card mounted in the priority slot. Where there is a sufficient empty memory space, the CPU 17 establishes the priority slot as the slot to be accessed, while where there is not a sufficient memory space available, the CPU 17 checks the empty memory space in the memory card mounted in the other slot to establish it as the slot to be accessed (steps S63 through S66). Where either memory cards 40a or 40b do not have a sufficient memory space, the error routine is performed (step S67).

Figure 10:
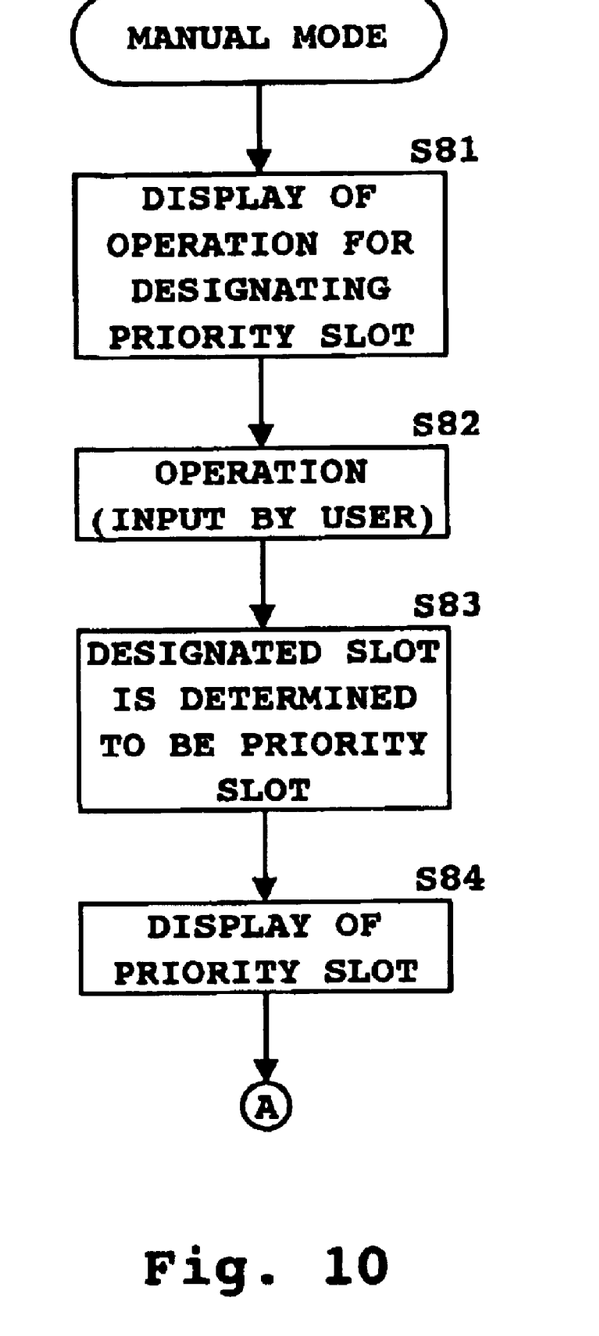
FIG. 10 is a flow chart showing the operation sequence when the slot to be accessed is selected.

The operation sequence when the manual operation mode is activated is shown in the flow chart shown in FIG. 10. The CPU 17 displays the operation guide screen shown in FIG. 6 in the monitor 25 (step S81). The priority slot is input by the user operating the four-direction keys 6c through 6d (step S82). The priority slot designated by the user is communicated from the camera control CPU 31 to the CPU 17. The CPU 17 then deems the slot designated by the user from among the multiple slots 41a and 41b as the priority slot (step S83). As a result, either one of the slots 41a and 41b is deemed the priority slot based on the user's intention. The CPU 17 then advances to step S84 and communicates which slot is the priority slot to the camera control CPU 31, whereupon the priority slot is displayed in the camera function display 9 as shown in FIG. 11.

The CPU 17 advances to the sequence from step S63 onward shown in the flow chart of FIG. 8, and establishes the slot to be accessed by performing the same sequence as the one described above (steps S63 through S67).

By performing the sequence described above, it is automatically detected whether or not memory cards are mounted in the slots, and the slot to be accessed may be selected from among the multiple slots based on the state of mounting of memory cards. Therefore, even when only one memory card is mounted in one of the slots, for example, the slot in which the memory card is mounted is automatically specified and deemed the slot to be accessed. Consequently, the user need not pay particular attention to the slot in which a memory card is mounted, leading to easier operation.

In addition, multiple memory cards may be mounted in the slots without paying attention to the order of mounting. Unless all of the memory cards lack sufficient memory, errors will not result when recording is performed.

In particular, where the slot to be accessed is selected using the priority mode, the picked-up images may be sequentially stored in the order in which the memory cards were mounted in the digital camera 1 by the user, making it easy to manage the picked-up images after they are stored.

Further, since any of the three modes may be set based on the user operation as described above, the mode from which to select the slot to be accessed may be activated based on the user's desires, which contributes to making the digital camera 1 easy to use.

<4. Modifications>

One embodiment of the present invention was explained above, but the present invention is not limited to the embodiment explained above.

For example, in the embodiment described above, it is memory cards that are mounted in the multiple slots 41a and 41b, but the image storing medium may instead comprise magnetic disk (magnetic disk cards) or magneto-optical disk (magneto-optical disk cards).

In addition, the functioning portions by which to select the slot to be accessed from among the multiple slots may be located separately from the image processing unit 10, or the camera control CPU 31 may be constructed such that it carries out such a function.

As explained above, at least two image storing media are mounted in the multiple slots, the selector selects, from among multiple slots, the slot to be accessed into which an image storing medium was first mounted, enabling the picked-up images to be sequentially stored in the image storing media beginning with the image storing medium that was mounted first, so that errors do not result even if the user mounts the image storing media without paying attention to the slot in which they are mounted, making the camera easier to operate.

Additionally, the digital camera has a selected slot display that displays the slot selected by the selector, so that the selected slot may be visually confirmed.

Moreover, the selected slot display is located separately from the display that displays the picked-up image, and therefore the selected slot may be visually confirmed during the photographing as well.

Further, the digital camera has a mode setting member that sets one selection mode from among multiple selection modes from which to select from among the multiple slots the slot to be accessed, and the slot to be accessed is selected from among the multiple slots in accordance with the selection mode set by means of the mode setting member, and therefore, the slot to be accessed may be selected based on the user's desires, which improves the ease of operation of the digital camera.

Still further, the digital has the multiple selection modes include (a) a mode in which a particular slot is selected as the slot to be accessed at all times from among the multiple slots, (b) a mode in which the slot in which a storing medium was first mounted is selected as the slot to be accessed, and (c) a mode in which a slot is selected from among the multiple slots as the slot to be accessed based on an operation performed by means of an operating member. In this case, one slot from among multiple slots is selected as the slot to be accessed irrespective of the set mode.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A digital camera comprising:

a plurality of mounting portions to which recording media can be mounted;

a detector which detects whether or not the recording media are mounted to said mounting portions; and a selector which selects from among said mounting portions a portion to be accessed based on the detection result of said detector, wherein, where at least two recording media are mounted to said mounting portions, said selector selects the mounting portion to which the recording medium was mounted first as the mounting portion to be accessed.

2. A digital camera according to claim 1 further comprising a first display which displays information regarding the mounting portion selected by said selector.

3. A digital camera according to claim 2 further comprising a second display which displays the picked-up image, and said first display and said second display are located separately from each other.

4. A digital camera according to claim 1, wherein each of said mounting portions is a connector to be mechanically and electrically connected to each of the recording media.

5. A digital camera according to claim 1, wherein each of said mounting portions is a slot inside of which each of the recording media is housed.

6. A digital camera according to claim 1, wherein each of said mounting portions has a slot inside of which each of the recording media is housed and a connector to which the recording media housed in said slot is mechanically and electrically connected.

7. A digital camera comprising:

a plurality of mounting portions to each of which a recording medium is mounted;

a mode setting member which is operated to set a mode from among a plurality of selection modes, in each of said plurality of selection modes the mounting portion to be accessed being selected from among said plurality of mounting portions; and a selector which selects one of said mounting portions to be accessed from among said plurality of mounting portions in accordance with the selection mode set by the operation of said mode setting member, wherein the selection modes include a mode in which the mounting portion in which a storm medium was first mounted is selected as the mounting portion to be accessed.

8. A digital camera according to claim 7, wherein the selection modes include a mode in which a particular mounting portion is selected as the mounting portion to be accessed at all times from among said plurality of mounting portions.

9. A digital camera according to claim 7, wherein the selection modes include a mode in which a mounting portion is selected from among said plurality of mounting portions as the mounting portion to be accessed based on an operation performed by means of an operating member.

* * * * *

UNITED STATES PATENT AND TRADEMARK OFFICE
CERTIFICATE OF CORRECTION

PATENT NO. : 6,927,794 B2
DATED : August 9, 2005
INVENTOR(S) : Hiroaki Kubo and Yasuhiro Morimoto It is certified that error appears in the above-identified patent and that said Letters Patent is hereby corrected as shown below:

Column 12,
Line 30, delete "storm medium" and insert -- storing medium --.

Signed and Sealed this

Fourth Day of October, 2005

JON W. DUDAS
*Director of the United States Patent and Trademark Office*